Dec. 15, 1959   W. H. JUSTUS   2,917,733
DISPLAY SIGNS
Filed Dec. 27, 1955   6 Sheets-Sheet 1

Fig. 1

INVENTOR.
William H. Justus
BY
Gruhlwells
Atty.

Dec. 15, 1959   W. H. JUSTUS   2,917,733
DISPLAY SIGNS
Filed Dec. 27, 1955   6 Sheets-Sheet 2

Time Switch #6, Bank #2

Fig. 8

INVENTOR.
William H. Justus
BY
Att.

Dec. 15, 1959 W. H. JUSTUS 2,917,733
DISPLAY SIGNS
Filed Dec. 27, 1955 6 Sheets-Sheet 3

INVENTOR.
William H. Justus
BY
*Stuhlwells*
Atty.

Dec. 15, 1959 W. H. JUSTUS 2,917,733
DISPLAY SIGNS
Filed Dec. 27, 1955 6 Sheets-Sheet 4

INVENTOR.
William H. Justus
BY
*Strahlwells*
Atty.

Dec. 15, 1959

W. H. JUSTUS 2,917,733

DISPLAY SIGNS

Filed Dec. 27, 1955

INVENTOR.
William H. Justus
BY
Atty.

Dec. 15, 1959 W. H. JUSTUS 2,917,733
DISPLAY SIGNS

Filed Dec. 27, 1955 6 Sheets-Sheet 6

Fig. 12

INVENTOR.
William H. Justus
BY
Atty.

United States Patent Office

2,917,733
Patented Dec. 15, 1959

2,917,733

DISPLAY SIGNS

William H. Justus, Spokane, Wash., assignor to American Sign & Indicator Corporation, Spokane, Wash.

Application December 27, 1955, Serial No. 555,362

5 Claims. (Cl. 340—334)

The present invention relates to improvements in display signs, and particularly in display signs wherein combinations of lighted and unlighted lamps in a bank are utilized to spell out the correct time and temperature in alternate displays.

It is the principal purpose of the invention to provide a device of this character having one or more display panels upon which time and temperature displays are alternately made, the displays consisting of combinations of lighted and unlighted lamps spelling out, in numbers, the correct time and temperature, the time displays and temperature displays being each controlled by a separate mechanism, and a system of transfer relays operable to connect the lamps to the time indicating mechanism and to the temperature indicating mechanism whereby to utilize the same banks of lamps for each alternate display.

The device comprises a display panel having a plurality of lamps thereon arranged in banks and in sufficient number to display a minimum of four numerals to indicate time or to display three numerals to indicate temperature. The lamps are connected in several circuits and each circuit is connected to a transfer relay. A time indicating mechanism having a separate switch for each circuit, and a temperature indicating mechanism having a separate switch for each circuit are also included. Each of the time and temperature indicating mechanisms is capable of setting up combinations of open and closed switches to always display correct information regarding time or temperature when its switches are placed in control of the lamps, the closed switches lighting the lamps they control and the open switches maintaining their lamps darkened. The switches of the time control mechanism are connected to the transfer relays in such a manner as to control the lamps when the transfer relays are deenergized. If power is supplied to the switches in the time indicating mechanism and the transfer relays are deenergized, the lamps will be lighted to display the correct time. The switches of the temperature indicating mechanism are connected to the coils of the relays so that when power is supplied to the temperature switches, those which are closed will energize their relays and connect the corresponding lamps directly to a source of power thereby lighting them to display correct temperature. The device also includes a mechanism for causing power to be alternately supplied to the time and temperature switches to alternate the displays. When the switches of one mechanism are supplied with power, the switches of the other are not. Thus the lamps are only lighted by one mechanism at a time.

The nature and advantages of my invention will appear more fully from the following description and the accompanying drawings. The drawings and description are illustrative only, however, and are not intended to limit the invention except insofar as it is limited by the claims.

It is believed that the specific details of the construction and operation of the invention will be most easily understood by considering the lamp bank, the time indicating mechanism, the temperature indicating mechanism and the transfer mechanism separately.

Figure 2:
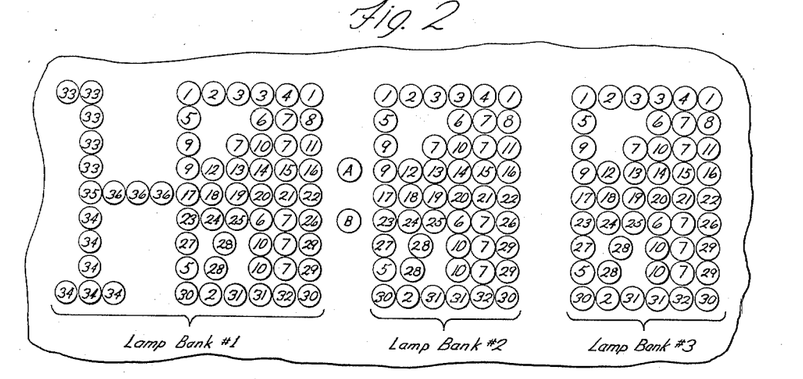
Figure 2 is a diagrammatic view illustrating the display panel.

The function of the invention is to display alternately the correct time and temperature upon a common display panel. Such a panel is illustrated in Figure 2 of the drawings. The display panel must be capable of displaying a four number design to indicate the correct time throughout the day, and of displaying a three number design to indicate the temperature. To this end, the panel is provided with three lamp banks, indicated as lamp banks 1, 2 and 3 in Figure 2. Lamp bank 1, at the left end of the panel is used to display numbers ranging from 1 to 12 to represent the hours of the day, and to display numbers ranging from —9 to 12 to represent each ten degrees of temperature from —90 degrees F. to 120 degrees F. Lamp bank 2 is used to display numbers from 0 to 5 to represent ten minute lengths of time, and numbers from 0 to 9 to indicate units of temperature. Lamp bank 3 is used to display numbers from 0 to 9 to indicate minutes of time.

Each of the banks 2 and 3 comprises a plurality of lamps arranged in a rectangular bank. In the particular configuration shown in Figure 2, the lamps are arranged in nine horizontal rows of lamps, each row, with the exception of a few, containing six lamps. Certain of the rows contain less than six lamps since certain portions of the rectangular bank are not needed in displaying numbers from 0 to 9. It has been found that certain of the lamps are always used together in displaying a number, so these lamps are connected together in parallel, and operated from a single power lead. With the six by nine lamp bank shown, the banks 2 and 3 each need 32 power leads to provide for displaying any number from 0 to 9. The lamps lighted by each of these leads are numbered in Figure 2 from 1 to 32, the lamps bearing the same number being connected in parallel to the same lead. For example, each lamp labeled number 7 is connected to lead 7. All of the lamps in the display panel are connected to a common ground.

Lamp bank 1, in addition to having a six by nine block of lamps identical to banks 2 and 3, has additional lamps arranged in the form of a numeral one, with a horizontal row of lamps extending from it to the rectangular block. This is necessary to display on bank 1 such numbers as 11 and 12, and a minus sign. As in the other two banks, 32 power leads are necessary to operate the rectangular block of bank 1, and the lamps are numbered accordingly. To operate the additional lamps in bank 1, four additional circuits are needed. The lamps in these circuits are numbered 33–36 accordingly. When numbers above nine are displayed on bank 1, lamps 33, 34, and 35 are lighted to display a one. When temperatures below zero degrees are displayed, lamps 35 and 36 are lighted to display a minus sign. It will be noted that lamps 33 and 34 always operate together and could be operated from a single source. This is not done because of the high current requirements which would be present.

It should be understood that while the lamps in the three banks bear corresponding numbers, each bank is operated separately, and no lamps from one bank are connected to lamps of another bank.

In addition to the lamp banks just described, the display panel is provided with two other lamps identified as A and B. Lamps A and B are connected in parallel, and lighted in the time display to represent a colon between the hour and minutes. They remain dark during the temperature display.

Figure 3:
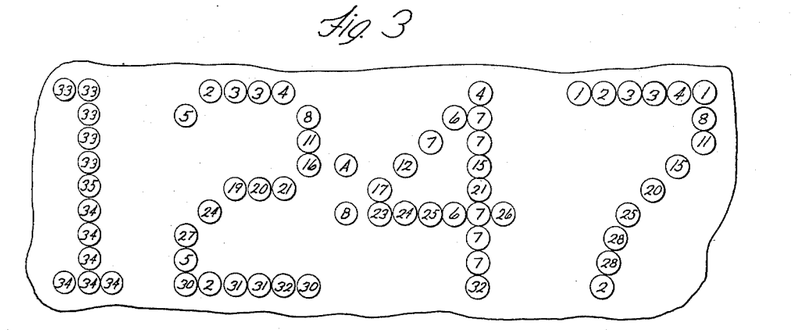
Figure 3 is a view similar to Figure 2 except showing only those lamps lighted in a particular time display.

Figure 3 shows a typical time display on the panel. Only the lighted lamps are indicated. The numbers in the lamps indicate which circuits in each bank are energized. This display will remain on the panel for a desired length of time and then a temperature display will appear. If, for example, the correct temperature is 24 degrees F., the same lamps representing the two in bank 1 and the four in bank 2 will be lighted, the remainder of the lamps in the panel being darkened.

Figure 8:
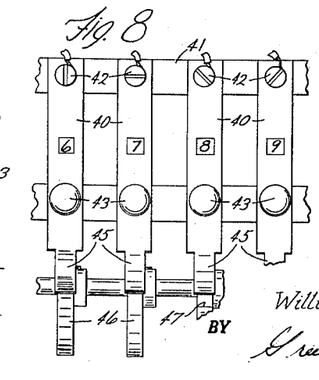
Figure 8 is a fragmentary elevational view of a portion of one of the switch banks.

The time indicating mechanism, best illustrated in Figures 1, 4 and 8, will now be described. This mechanism comprises three banks of cam operated switches, one bank of switches for each lamp bank. Each bank of switches includes a separate switch for each circuit in the corresponding lamp bank, so that by opening and closing the proper switches in each switch bank, a desired number may be made to appear on the corresponding lamp bank. The time mechanism includes motor and gear means operable to manipulate the several cam switches according to time. The particular mechanism utilized in this invention is, in itself, old so a general description thereof is believed sufficient.

Figure 1:
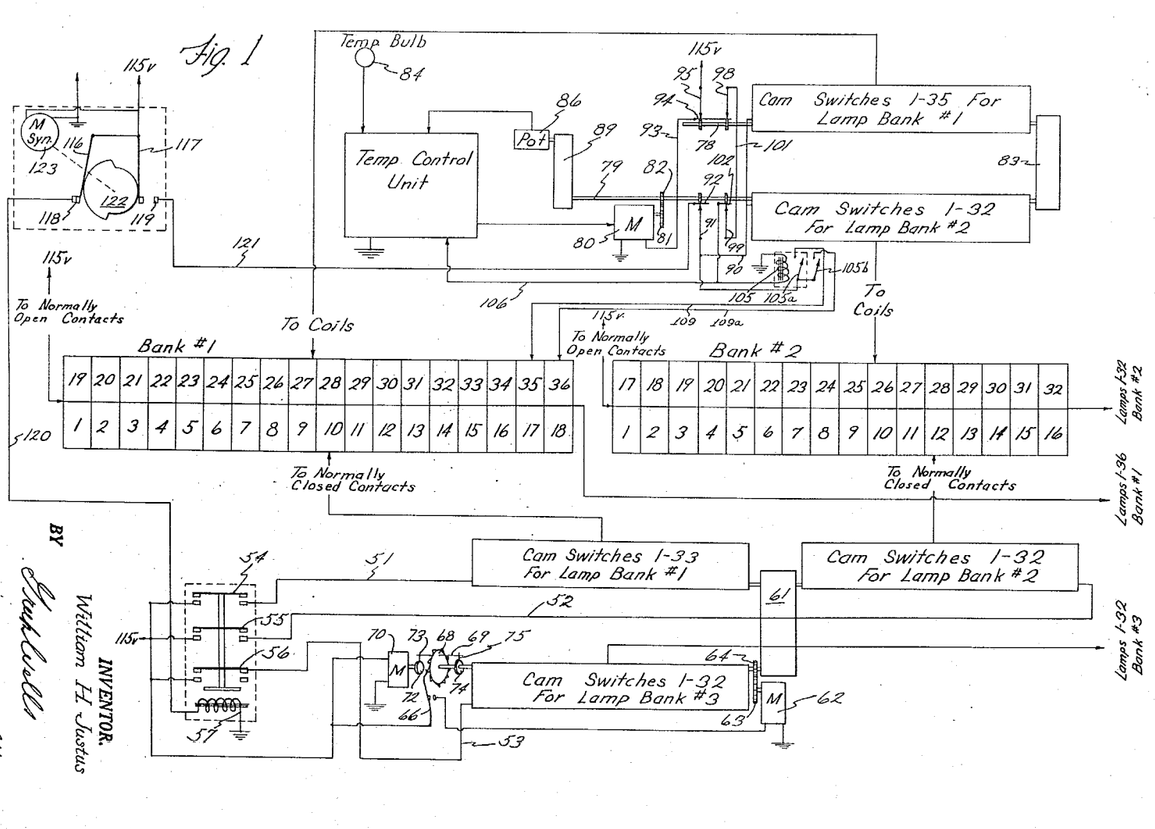
Figure 1 is a diagrammatic view illustrating the complete mechanism which provides for displaying alternate time and temperature displays on a display panel.
Figure 4:
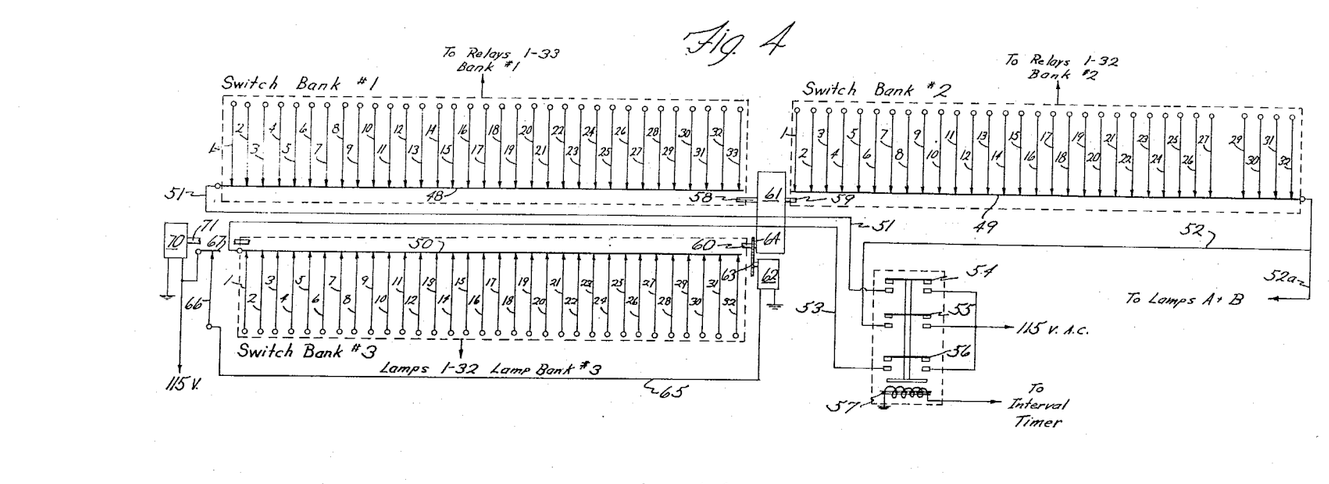
Figure 4 is a diagrammatic illustration of the circuit of the time indicating mechanism.
Figure 7:
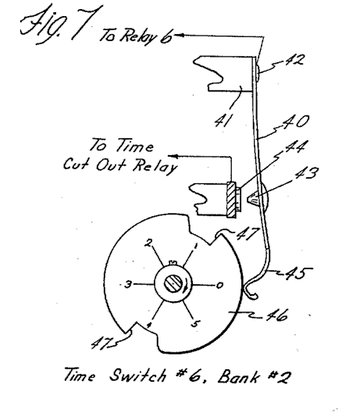
Figure 7 is a fragmentary sectional view of one of the switch banks illustrating the general construction of each of the cam switches in the device.

As shown in Figures 1 and 4, the time indicating mechanism comprises three banks of cam switches, the banks being indicated as switch bank 1, 2 and 3. The switches of each bank are shown diagrammatically in Figure 4 and the operating cams are not shown at all. Figures 7 and 8, however, illustrate the physical characteristics of the switches. Each switch comprises a spring metal strap 40 anchored to a phenolic block 41 by a screw 42. The strap 40 has a contact point 43 thereon, adapted to engage a second contact 44. The contact 44 is carried on a bus bar. The strap 40 has a cam engaging finger 45 at its free end. A cam 46 is positioned adjacent the finger 45 as shown in Figures 7 and 8. The cam 46 is of sufficient diameter to cause the finger 45 to hold the contact 43 away from the contact 44, but has at certain points on its periphery notches 47 which, when aligned with the finger 45, allow the contacts 43 and 44 to engage to close the circuit. The particular cam switch shown in Figure 7 is switch 6 of bank 2 of the time indicating mechanism. This switch is related to the circuit which controls lamps 6 of lamp bank 2. It is closed to energize that circuit only when the number one of four is to be displayed on that bank, and consequently, the cam 46 has notches 47 only at two points on the periphery.

As diagrammatically shown in Figure 4, switch bank 1 comprises thirty-three cam switches. These switches, when connected to the circuits of lamp bank 1 are capable of controlling the lamps in that bank. Switches 1 to 32 of switch bank 1 control lamp circuits 1 to 32 of lamp bank 1. Switch 33 controls lamp circuits 33, 34 and 35, so that when switch 33 is closed, those lamps are lighted to form a figure one. Lamps 36 are not used for time display. Switch bank 2 has thirty-one cam switches which, when connected to the circuits of lamp bank 2, are capable of controlling each lamp therein with the exception of lamps 28. Since in the time display, lamp bank 2 only displays numbers from zero to five, and since lamps 28 are only lighted to display a number seven, no switch is needed for these lamps. Switch bank 3 has thirty-two cam switches. These switches control the thirty-two lamp circuits of lamp bank 3.

Figure 4 shows diagrammatically the electrical connections for the switch banks 1, 2 and 3. As previously described, the switches in each bank contact a common bus bar. The bus bar for bank 1 is indicated at 48, the bus bar for bank 2 is indicated at 49 and the bus bar for bank 3 is indicated at 50. The bus bars 48, 49 and 50 are connected by lines 51, 52 and 53 to line switches 54, 55, and 56. The line switches 54–56 are connected in parallel to a 115 volt A.C. source. The line switches 54–56 are normally spring pressed in open position, but may be closed by energizing an electromagnet 57. The mechanism for energizing the electromagnet 57 will be described later herein.

When the electromagnet 57 is energized, the switches 54–56 are closed, and voltage is supplied to the bus bars 48, 49 and 50. If any of the cam switches in switch banks 1, 2 and 3 are closed, then the circuits they control will be energized. As shown in Figure 4 a line 52a extends from the switch 55 to lamps A and B, so that whenever the switches 54–56 are closed, lamps A and B are lighted to display the colon between the hour and minute numbers on the panel.

As previously described, switch bank 1 is utilized to light lamps to display the hour, bank 2 to display the ten minute number, and bank 3 to display the minute. The switches in each bank are manipulated by the cams 46. The cams 46 in bank 1 are fixed on a shaft 58, the cams in bank 2 are fixed on a shaft 59 and the cams in bank 3 are fixed on a shaft 60. The shafts 58, 59 and 60 are each connected to a gear box 61 so that they are rotated at proportionate speeds. The shaft 58 carrying the hour indicating cam 46 makes one complete revolution each twelve hours. The cams 46 thereon are capable of setting up twelve separate switch combinations to indicate the hours from one to twelve in sequence as the shaft rotates. The shaft 59 carrying the ten minute indicating cams 46 makes one complete revolution each hour. The cams 46 thereon are capable of setting up six switch combinations indicating in sequence the numbers from zero to five as the shaft rotates. The minute shaft 60 makes one complete revolution every ten minutes. The cams 46 fixed on the shaft are capable of setting up ten switch combinations to display numbers from zero to nine in sequence.

Figure 5:
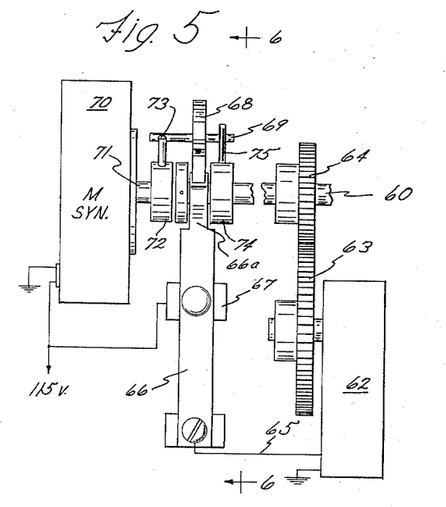
Figure 5 is a side view of the motor and switch means which maintain correct time switch combinations on the time indicating mechanism.
Figure 6:
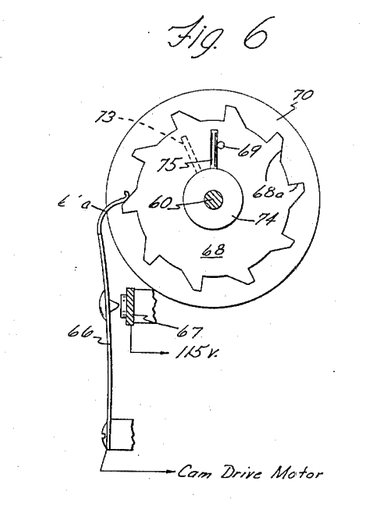
Figure 6 is a sectional view taken on the line 6—6 of Figure 5.

The mechanism for rotating the shafts 58–60 may best be understood by examining Figures 4, 5 and 6. As shown in Figure 4, the shafts 58–60 are each connected to a gear box 61, so that rotation of one causes proportionate rotation of the remaining two. The minute shaft 60 is driven by a drive motor 62 through gears 63 and 64, as shown in Figures 4 and 5. The drive motor 62 receives power through a line 65 which is connected to a cam switch 66 mounted at the end of switch bank 3. Cam switch 66 closes against a bus bar 67 which is connected to a 115 volt A.C. source. Whenever cam switch 66 is closed voltage is supplied to motor 62 and the shaft 60 is driven. The shaft 60, through the gear box 61, also drives shafts 58 and 59.

Cam switch 66 is manipulated by a cam 68, shown best in Figure 6. The cam 68 has ten lugs 68a thereon which, when driven past the cam finger 66a of the switch, will cause the switch to be opened. The cam 68 is mounted on the shaft 60, but not fixed thereto. The cam 68 is free to float on the shaft 60, and is driven by means of a cross pin 69 extending therethrough. A synchronous motor 70 is mounted adjacent the end of the shaft 60. A collar 72 is fixed on the motor shaft 71 and has a radial pin 73 thereon. The pin 73 engages the cross pin 69 and drives the cam 68. A second collar 74 is fixed on the cam shaft 60 and has a radial pin 75 thereon. The pin 75 also is capable of engaging the cross pin 69 and driving the cam 68. With the construction just described, the shaft 60 is rotated one-tenth of a revolution each minute. The operation is as follows: The synchronous motor 70 is connected directly to the line and rotates at a constant speed of one-tenth r.p.m. Assume that the cam 68 is so positioned that the finger 66a of switch 66 is riding up one of the lugs 68a, and the switch is open. Assume also that the pin 73, driven by the motor 70 is engaged with the cross pin 69. As the motor 70 rotates, the pin 73 will drive the cam 68. When the cam has been driven enough to allow the finger 66a to drop off the lug 68a, the switch will be closed, and motor 62 is energized. Motor 62 will drive shaft 60, and consequently will drive the collar 74 and pin 75. The motor 62 operates at a relatively high speed, so the pin 75 will move around and contact the pin 69 to drive the cam 68. The pin 75 will drive the cam 68 until the next lug 68a engages the finger 66a and opens the switch 66. Opening the switch 66, of course, stops the motor 62, and stops rotation of the cam 68. The cam 68 remains stopped until the pin 73, driven by motor 70, catches up and starts driving again. The process is then repeated. The time elapsing between each closing of the switch 66 by the motor 70 is one minute. The distance which the motor 62 drives the shaft 60 before opening the switch 66 is one-tenth of a revolution. Thus the shaft 60 is driven one-tenth of a revolution each minute, and during each period of revolution sets up a new combination of the switches 1–32 of bank 3. Through the gear box 61, the shafts 58 and 59 are also driven to set up the proper combinations in their switch banks. It should be noted that the source of power for the motors 62 and 70 is entirely independent of the line switches 54–56 and the motor 70 is driven continuously. Thus the proper combinations in switch banks 1, 2 and 3 are always maintained to display the correct time, whether voltage is supplied to the bus bars 48–50 or not. Therefore, at any time the bus bars 48–50 are connected to the line by the switches 54–56, the correct time will be displayed.

The temperature indicating mechanism, best shown in Figures 1 and 9 will be described next. This mechanism comprises two banks of cam switches, one for each of lamp banks 1 and 2. These banks of cam switches will be referred to as temp. switch bank 1 and temp. switch bank 2. As in the time indicating mechanism each bank of temp. switches includes a separate switch for each circuit in its corresponding lamp bank. By opening and closing the proper switches, a desired number may be made to appear on the corresponding lamp bank. The cam switches in each temp. switch bank are manipulated according to the resistance of a temperature sensitive element. The particular mechanism utilized in this invention is, of itself, old and its novelty resides in the combination thereof with the other elements of the invention. It is believed that a general description of the temperature indicating mechanism will suffice.

Figures 9, 10, 11:
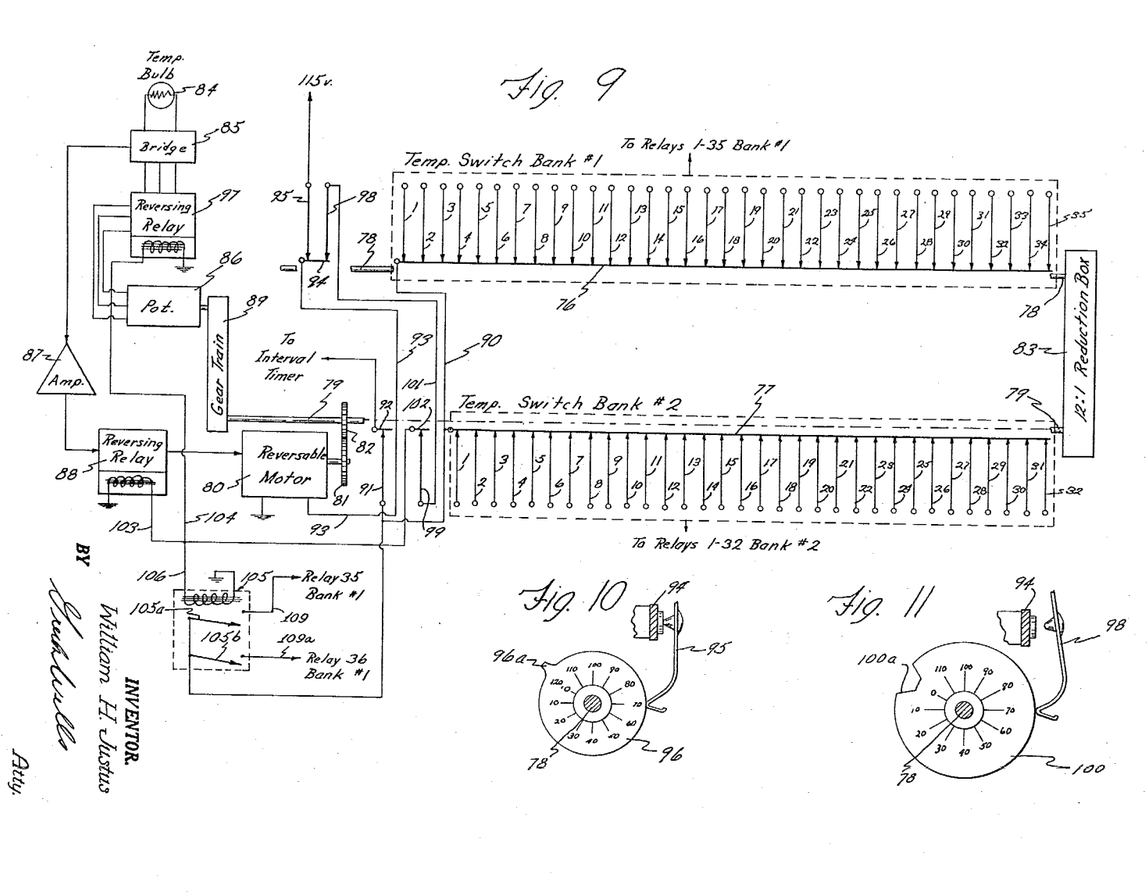
Figure 9 is a diagrammatic illustration of the circuit of the temperature control mechanism.
Figure 10 is a fragmentary sectional view showing the shape of the limit switch cam.
Figure 11 is a fragmentary sectional view showing the shape of the zero switch cams.

As shown in Figure 9, the temperature indicating mechanism comprises two banks of cam switches, indicated as temp. switch banks 1 and 2. The individual switches in each bank are identical to those shown in Figures 7 and 8, and operated in the same manner. The only difference is that the cams 46 in the temperature switch banks are designed to rotate in either direction. Temp. switch bank 1 comprises thirty-five cam switches. These switches, when connected to lamp bank 1 are capable of controlling the lamps in that bank. Switches 1–32 of temp. switch bank 1 control lamps 1–32 of lamp bank 1. Switches 33, 34 and 35 control lamps 33, 34 and 35 so as to display a one for temperatures above 100 degrees F. Temp. switch bank 2 has thirty-two cam switches which, when connected, control the thirty-two lamp circuits of lamp bank 2.

As shown diagrammatically in Figure 9, the thirty-five switches of temp. switch bank 1 all contact a common bus bar 76. The switches of bank 2 contact a common bus bar 77. Whenever power is supplied to bus bars 76 and 77, the switches which are closed will carry current to the circuits they control. The cams 46 which manipulate the switches in temp. switch bank 1 are mounted on a shaft 78. The cams which manipulate the switches in bank 2 are mounted on a shaft 79. The shaft 79, carrying the cams for temp. switch bank 2 is driven by a reversible motor 80 through gears 81 and 82. Through a gear box 83, the shaft 79 drives the shaft 78. Since the switches of bank 1 must be capable of indicating twelve different numbers, representing temperatures from 0 to 120 degrees F. the cams on shaft 78 must be capable of manipulating the switches upon one-twelfth of a revolution. The cams on shaft 79 must be capable of setting up ten different switch combinations to indicate numbers from 0 to 9 degrees F. For every full revolution of shaft 79, shaft 78 is rotated one-twelfth of a revolution.

As stated above, shaft 79 is driven by a reversible motor 80. In order to cause the motor 80 to drive the shaft 79, and consequently the shaft 78, to set up switch combinations to display the correct temperature, the motor 80 must be operated according to a change in temperature, and must be driven one direction due to temperature rise, and another direction due to temperature drop. To accomplish this, a measuring bridge and amplifier mechanism is utilized. A temperature bulb 84, containing a resistance element, the resistance of which varies linearly with temperature, is provided. This bulb 84 is made one element of a resistance measuring bridge 85. The bridge 85 also includes a mechanically adjustable resistance unit, a potentiometer, indicated at 86. The construction is such that when the resistance of the bulb 84 changes, the bridge 85 becomes unbalanced. This unbalance is manifested in the form of a voltage. The voltage of unbalance is communicated to an amplifier 87 where it is amplified enough to operate the motor 80. From the amplifier 87, the signal is sent through a reversing relay 88, the function of which will be described later, and to the motor 80. The signal generated in the bridge 85 and amplified in the amplifier is so referenced that an unbalance caused by lowering of the resistance of the bulb 84 causes the motor to operate in one direction, while unbalance caused by increase of bulb 84's resistance causes motor 80 to drive in the opposite direction.

As hereinbefore described the motor 80 drives the cam shaft 79. At the end of the shaft 79 opposite the gear box 83, a gear train 89 is located. The gear train 89 transmits rotational power from the shaft 79 to the potentiometer 86. Thus when the motor 80 drives, it mechanically changes the resistance of the bridge 85 through the potentiometer 86. The direction of rotation is such that the motor 80 always drives the potentiometer 86 in a direction to balance the bridge 85. With the circuit just described, then any unbalance caused by a change of resistance of the bulb 84 causes the motor 80 to rotate until the bridge is rebalanced. By proper calibration and adjustment, this driving of the motor 80 may be made to manipulate temp. switch banks 1 and 2 so as to always display the correct temperature. The relation between the motor 80 and potentiometer 86 is such that every full revolution of the shaft 79 by the motor 80 causes the potentiometer 86 to make a resistance change equal to the change in resistance of the bulb 84 caused by a ten degree temperature variation. Thus for each degree of temperature change, the motor 80 is driven so as to rotate the shaft 79 one-tenth of a revolution before the bridge 85 is rebalanced and the signal stopped. This one-tenth revolution causes the cams 46 on the shaft 79 to manipulate the switches of bank 2 to set up the correct combination to display the temperature number.

The bus bars 76 and 77 for temp. switch banks 1 and 2 are connected in parallel to a line 90. The line 90 is connected to a cam switch 91 which is positioned at the end of bank 2 and operated by a cam (not shown) on shaft 79. The switch 91 is a bus bar contactor switch and the operating cam thereof is shaped to cause the switch 91 to open during the time when the shaft 79 is being rotated between degree stops. Opening of the switch 91 disconnects the bus bars 76 and 77 and prevents an unintelligible combination of lamps from being lighted during degree changes. This is necessary since, in the temperature mechanism, the rotation of the shafts 78 and 79 is fairly slow. The switch 91 contacts a bus bar 92 which is connected to the power source for the switches, described later herein.

The motor 80 has two separate power sources, one from the amplifier 87, and another now to be described. Both of these sources must supply power before the motor 80 will operate. The second power source for the motor 80 is obtained through a line 93 connected to a bus bar 94 positioned at the end of temp. switch bank 1. The bus bar 94 is contacted by a cam switch 95, known as the limit switch. The switch 95 is connected to the 115 v. line. As shown in Figure 10, the limit switch 95 is manipulated by a cam 96 fixed on the shaft 78. The cam 96 is shaped to permit the switch 95 to remain closed during nearly the whole 360 degrees of rotation of shaft 78. As mentioned hereinbefore, the shaft 78 makes one revolution during temperature change from 0 degrees F. to 120 degrees F. Temperature rise above 120 degrees F. cannot be recorded, since temp. switch bank 1 cannot set up proper switch combinations to display the number 13 on lamp bank 1. Also the bridge 85 is incapable of balancing when the temperature rises above 120 degrees F. since at that point the potentiometer 86 has been adjusted to its limit. Therefore, to prevent further driving of the motor when the temperature reaches 120 degrees F. the limit switch cam 96 is provided with a lug 96a which will engage and open the switch 95 when the temperature reaches 120 degrees F. Opening of the switch 95 will shut off the motor 80.

When the temperature reaches 0 degrees F. and continues to drop, another problem arises. The motor 80, as stated above, rotates in one certain direction for temperature decline. If the motor 80 were allowed to continue in this direction, a temperature of −1 degree F. would cause display of 129 on the lamp banks. This would occur since the switch banks set up switch combinations in sequence upon rotation. Rotation for temperature decline causes the banks to set up combinations in reverse, and after the zero appears, the next number in the reverse direction is 12 for bank 1 and 9 for bank 2. Therefore it is necessary to provide means for reversing the direction of the motor 80 when the temperature drops below zero, to allow the motor 80 to drive the cams 46 for the temp. switch banks 1 and 2 in a direction to set up numbers in direct sequence rather than in reverse. Since the motor 80 is to drive in the opposite direction, the connection of the potentiometer 86 in the bridge 85 must also be reversed. It is to accomplish this that the reversing relay 88 is included between the amplifier 87 and motor 80. A similar reversing relay 97 is included between the potentiometer 86 and bridge 85. The relays 88 and 97 are of the ratchet or impulse type wherein a single and non-continuous impulse of power is sufficient to change a switch from one position to the opposite position. The switch will stay in either position until the relay is impulsed again.

To operate the relays 88 and 97, two switches are utilized. A switch 98 is provided at the end of bank 1 and a switch 99 at the end of bank 2. These switches, called zero switches, are manipulated by cams 100 mounted on the shafts 78 and 79. The cam 100 for switch 98 is fixed on shaft 78, as shown in Figure 11. The cam 100 is shaped to hold the zero switch 98 open during most of the revolution of shaft 78. A notch 100a is provided which will allow switch 98 to close when the shaft is in the position it occupies for temperatures between 0 degrees F. and 9 degrees F. When the switch 98 is closed, it contacts the bus bar 94 and receives current therefrom. Switch 98 is connected by a line 101 to switch 99, the operating cam 100 for which is mounted on shaft 79. This cam is identical to the other and closes the switch 99 only when shaft 79 has just moved from the position occupied at 0 degrees F. and is about to move in the reverse direction to indicate the numeral nine. Switch 99 contacts a bus bar 102 which is connected to lines 103 and 104 leading to the relays 88 and 97. With this construction, both switches 98 and 99 must be closed to impulse the relays 88 and 97, and the switches 98 and 99 are only closed, simultaneously when the temperature is at 0 degrees F. and still dropping.

A third rachet type relay 105 is connected by a line 106 to the bus bar 102 and is closed by the reversing impulse. This relay has two switches 105a and 105b. The switches 105a and 105b control lamp circuits 35 and 36 of lamp bank 1 and display a minus sign for temperatures below zero.

Figure 12:
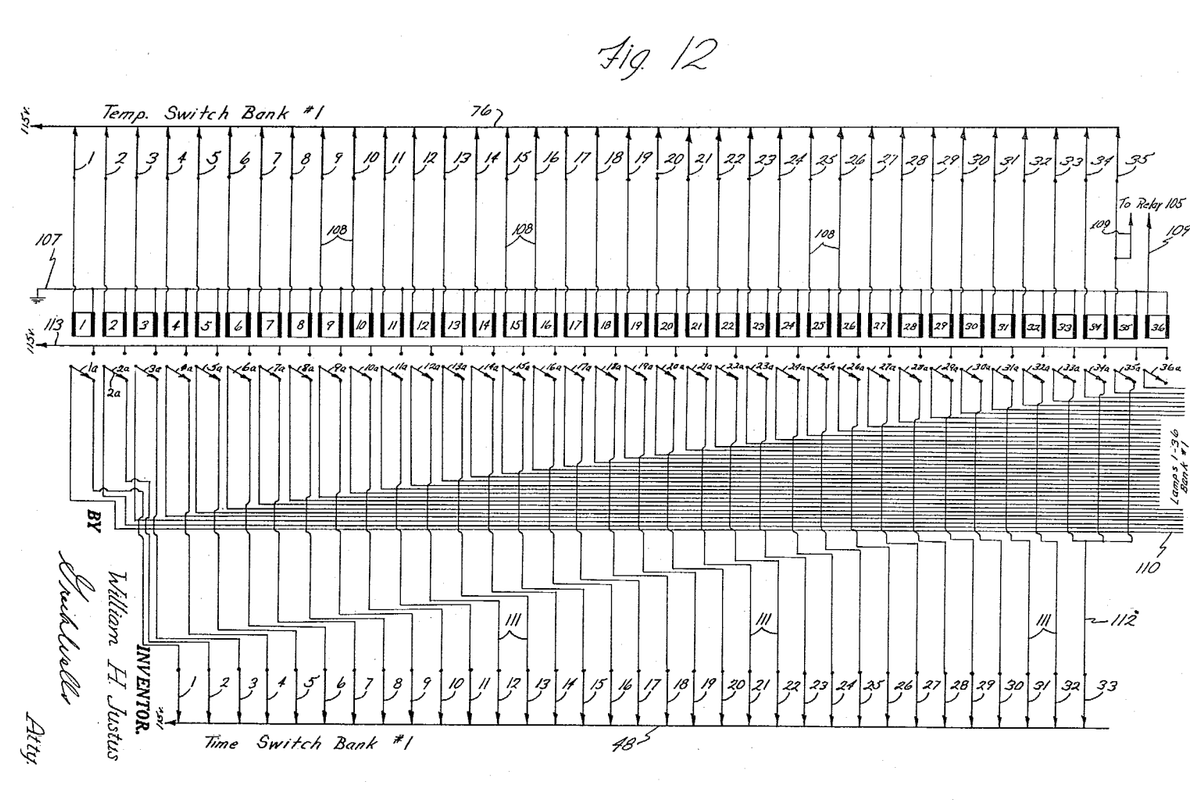
Figure 12 is a diagrammatic view illustrating the circuit connections to the transfer relays for the first lamp bank.
Figure 13:
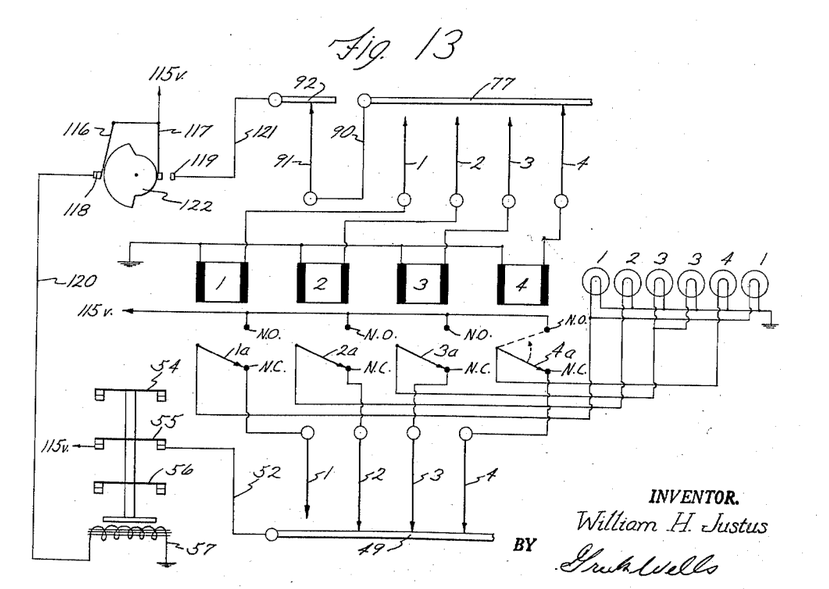
Figure 13 is a diagrammatic view showing the operation of the switches and relays controlling an operation of the switches and relay controlling a representative row of lamps on the display panel.

As hereinbefore described the lamp banks 1 and 2 are utilized to indicate both time and temperature. Lamp bank 3 is not used for temperature display and its 32 circuits are connected directly to the switch bank 3 of the time indicating mechanism, as shown in Figure 1. However, to alternately display time and temperature numbers on lamp banks 1 and 2, some transfer mechanism must be included to transfer each of lamp circuits 1–36 of lamp bank 1 and circuits 1–32 of lamp bank 2 from the time mechanism to the temperature mechanism. To be efficient, such a transfer mechanism should not operate except when the lamp circuit it controls is actually needed for both time and temperature displays. Figures 1, 12 and 13 illustrate the mechanism.

The transfer mechanism comprises a plurality of single pole, double throw relays, one for each of the thirty-six circuits of lamp bank 1 and the thirty-two circuits for lamp bank 2. The connection of these relays may best be seen by examination of Figure 12 which shows the thirty-six relays for lamp bank 1 and their connections to the cam switches of time switch bank 1 and lamp switch bank 1. As shown, one side of each relay coil 1 to 36 is connected to a common ground line 107. The other side of each relay coil 1–36 is by a line 108 connected to the corresponding switch 1–35 in temp. bank 1. The coils of relays 35 and 36 are also connected by lines 109 and 109a to the switches 105a and 105b of relay 105. The single pole double throw switches 1a–36a of the relays 1–36 are spring pressed to a normally closed position as shown in Figure 12. However, when the coil is energized the switches are pulled to an energized position. The switches 1a–35a make contact in either position. In each relay 1–36 the switch itself is connected by a line 110 to the corresponding lamp circuit 1–36 of lamp bank 1. The normally closed switch contact (indicated as N.C. in Figure 13) of each relay 1–32 is connected by a line 111 to the corresponding switch 1–32 of time switch bank 1. The normally closed contact of each of relays 33, 34 and 35 are connected in parallel by a line 112 to switch 33 of time switch bank 1. The normally open switch contacts which are contacted by the switches 1a–36a of relays 1–36 in energized position (indicated as N.O. in Figure 13) are each connected to a common line 113. The line 113 is connected to the 115 v. line. The connections of relays 1–32 for lamp circuits 1–32 of lamp bank 2 are identical to those of bank 1.

The operation of the transfer relays is simple. While a particular relay is de-energized, the switch thereof is spring pressed to the normally closed contact. In this position, the switch of the relay closes the circuit from the lamp to the corresponding cam switch of the time indicating mechanism. Whenever the bus bar for that cam switch is energized and that cam switch is closed, then the lamp will be lighted. However, if the corresponding cam switch in the temperature indicating mechanism is closed and its bus bar energized, then the coil of the transfer relay will cause the relay switch to move to the energized, normally open position. This connects the lamp circuit directly to the 115 volt line. The relation may be stated as this: Each lamp circuit is connected normally to the time indicating mechanism. When needed, and only when needed, for temperature display, the lamp circuit is removed from connection with the time indicating mechanism and connected to the 115 volt line.

As hereinbefore stated the time and temperature display is alternated on the display panel. Since both of the mechanisms must operate continuously in order to indicate correct information, the alternating means cannot involve shutting down of the whole mechanism. However, since the several cam switches in the switch banks of each mechanism all receive power from the common bus bars, the displays can be alternated by alternating the power to the bus bars of each mechanism.

As previously described the common bus bars 48, 49 and 50 of the time display mechanism are controlled by the line switches 54, 55 and 56. These switches 54–56 are manipulated by an electromagnet 57. They are closed only when the electromagnet is energized.

In the temperature indicating mechanism, the bus bars 76 and 77 are controlled through the contactor switch 91 from the bus bar 92. It may easily be seen that if power is supplied alternately to the electromagnet 57 and the bus bar 92, the time and temperature displays will be alternated. To accomplish this, an interval timer mechanism shown in Figures 1 and 13 is provided. This mechanism comprises two switches 116 and 117 which are connected in parallel to the 115 volt line. The switches are adapted to close against contacts 118 and 119. Contact 118 is connected by a line 120 to the electromagnet 57. Contact 119 is connected by a line 121 to bus bar 92. The switches 116 and 117 are operated by a cam 122 to open and close alternately. The cam 122 is driven by a motor 123. The speed of the cam 122 determines the interval of time and temperature display. It has been found that a display of about five seconds is satisfactory.

Figure 13 best shows the operation of the cam switches and transfer relays. This figure illustrates the top row of lamps in lamp bank 2 and the mechanism by which they are controlled. This row of lamps is connected in four circuits, controlled by cam switches 1–4 of time switch bank 2, cam switches 1–4 of temp. switch bank 2, and transfer relays 1–4 of relay bank 2. Assume for example, that the time is 3:20 and the temperature is 74 degrees F. In this circumstance lamp bank 2 must alternately display a number two and a number four. In displaying a number two, circuits 2, 3 and 4 are needed in the top row. In displaying a number four, only circuit 4 is needed in the top row. In the time switch bank 2, the cam switches have been manipulated to indicate a number two. Switch 1 is opened but switches 2, 3, and 4 are closed and contacting bus bar 49. In the temp. switch bank 2, the cam switches have been manipulated to indicate a number four. Switches 1, 2 and 3 are opened, and switch 4 is closed and contacting bus bar 77. Assuming that neither bus bar 49 or 77 is energized, the switches 1a–4a of relays 1–4 of relay bank 2 are all in the normally closed position whereby to connect lamp circuits 1–4 to cam switches 1–4 of line switch bank 2. Now when the interval timing mechanism operates to close switch 116 to energize electromagnet 57, the line switch 55 will be closed. This energizes bus bar 49 and allows current to flow through the cam switches in contact therewith. As stated time cam switches 2, 3 and 4 are in contact with bus bar 49. Current passes through these switches, through the relay switches 1a–4a and to the lamps 2, 3 and 4, lighting these lamps. When the interval timer closes switch 117 and opens switch 116, the electromagnet 57 is deenergized and line switch 55 is opened, darkening the lamps previously lit. Switch 117 now being closed, current is fed through line 121 to bus bar 92, through contactor switch 91, and through line 90 to bus bar 77 of temp. switch bank 2. In this bank, switches 1, 2 and 3 are open and switch 4 is closed. Current passes through switch 4 and to the coil of relay 4 of relay bank 2. This relay is then energized and the switch thereof, switch 4a, is moved to the energized, or normally opened, position. In this position the switch 4a closes the circuit from the common "hot" line 113 to lamp circuit 4, lighting lamp 4 only. When switch 117 is opened again in the interval timing mechanism, the coil of relay 4 is de-energized and switch 4a returns to normally opened position and lamp 4 is darkened. As may be seen, the only transfer relays caused to operate are those controlling lamps actually needed in temperature display.

Figure 14:
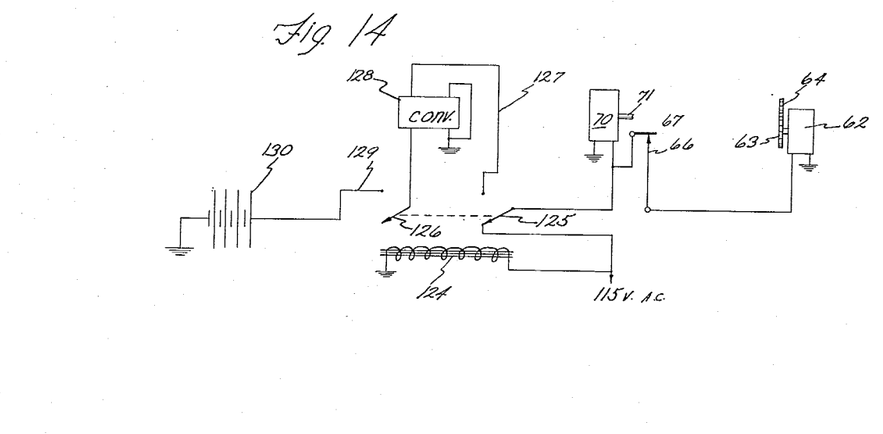
Figure 14 is a diagrammatic view showing the auxiliary power supply means for maintaining correct time throughout a power failure.

So long as a voltage approaching 115 volts is supplied to the device from the main lines, it will operate to display alternately the correct time and temperature. Should a temporary power failure occur, the device would temporarily cease to operate, of course. However, when power is again supplied, operation will resume. Power interruption will not affect the correctness of the temperature indicating mechanism, since it functions according to present temperature. If the temperature has changed during a power failure, the temperature mechanism will adjust to it. However, the time indicating mechanism cannot adjust itself to compensate for power failures, no matter how short in duration. Correct time depends upon continuous operation of the synchronous motor 70, and constant voltage supply for motor 62. In order to maintain correct time during power failures, an auxiliary power supply is provided for motors 70 and 62. This power supply is illustrated in Figure 14.

In the 115 v. line supplying power for the motors 70 and 62, a relay 124 is provided. The relay 124 has two single pole double throw switch sections 125 and 126. The switch 125 is placed in the 115 v. line to motors 70 and 62 to the supply line. However, should a power failure occur, and the relay 124 be de-energized, switch 125 will be moved to the de-energized position where it will connect motors 70 and 62 to a line 127 from a converter 128. The converter 128 is connected by a line 129 to a battery 130. The converter 128 receives power from the battery 130, changes it to alternating current, and by transformer action, increases its voltage to 115 v. In order to conserve the battery power when not needed, the line 129 is broken by the other switch section 126 of relay 124. When a power failure occurs, the relay 124 is de-energized and switches 125 and 126 caused to move to their de-energized position. This closes the line 129 and allows the battery 130 to supply power to the converter 128. The 115 v. power from the converter is supplied through line 127 and switch 125 to the motors 70 and 62, allowing their operation during power failure. When the main power is returned, the relay 124 is energized again and the battery and converter disconnected.

Thus, so long as the battery 130 is charged, the correct time combinations in time switch banks 1, 2 and 3 will be maintained.

The operation of the time and temperature display sign is entirely automatic, and operates to maintain correct time and temperature displays on the display panels. The improved transfer mechanism which provides for controlling the lamp banks by each of the time and temperature mechanisms is extremely efficient and free of trouble since no relay is required to operate unless the lamp circuit it controls is needed for temperature display. At all other times the relays are de-energized.

It is believed that the foregoing description taken in combination with the drawing, clearly discloses the nature and advantages of the invention.

Having thus described the invention, it is defined in the following claims:

1. A display sign comprising a display panel having a plurality of lamps thereon, said lamps being connected in a plurality of separate circuits and operable by energization of appropriate circuits to spell out information on the panel, a source of current supply, a first information indicating mechanism having a first group of switches, said first mechanism including means operable to manipulate said switches to maintain combinations of opened and closed switches representative of the information to be displayed, a second information indicating mechanism having a second group of switches, said second information indicating mechanism including means operable to manipulate said last named switches to maintain combinations of opened and closed switches representative of the information to be displayed thereby, means to connect the first and second groups of switches alternately to a source of power whereby to cause the closed switches of each group to conduct electricity, a plurality of separate controlling means controlling said separate lamp circuits, each of said last named means normally connecting its lamp circuit to one of the switches of the first group whereby to cause said switch of the first group to control the energization of the lamp circuit, and each of said separate control means being controlled by one of the switches of the second group whereby to disconnect its lamp circuit from the switch of the first group and connect the lamp circuit to a source of current supply when said switch of the second group is closed and conducting electricity.

2. In a display sign comprising a display panel having a plurality of lamps thereon, said lamps being connected in a plurality of separate circuits, separate information indicating mechanisms each including a plurality of switches manipulated by one of said mechanisms, a power source for the switches, and the lamp circuits being energizable by the switches of each mechanism, the improvement in means for alternately energizing the lamp circuits by the closed switches of each mechanism whereby to alternately display on the display panel the information of each mechanism, comprising a first common line connecting all of the switches of one information indicating mechanism to the power source, a second common line connecting all of the switches of the other information indicating mechanism to the power source, switch means in each of said common lines, means to alternately open and close said switch means to alternately supply power to the switches of each mechanism, and means operable when the switches of one mechanism are not connected to the power source to disconnect the closed switches of said mechanism from the lamp circuits whereby to prevent current flowing to said lamps from travelling therefrom through said closed switches of said mechanism to energize all of the switches of said mechanism through the common line.

3. In a display sign comprising a display panel having a plurality of lamps thereon which are connected in a plurality of separate circuits, a source of current supply, a first continuously changeable indicating mechanism operable in response to changes in one changing function and a second continuously changeable indicating mechanism operable in response to changes in a second changing function, the improvement comprising a first group of switches actuated by said first mechanism to maintain combinations of opened and closed switches representative of the one function, a second group of switches actuated by said second mechanism to maintain combinations of opened and closed switches representative of the second function, a separate circuit controlling means controlling each of said lamp circuits, each of said circuit controlling means normally connecting its lamp circuit to a switch of the said first group of switches, each of the circuit controlling means being operable by a switch of the second group of switches to disconnect its lamp circuit from the corresponding switch of said first group of switches and to connect its lamp circuit to a source of current when said switch of the second group of switches is closed and current supplied thereto, and means connecting said first and second groups of switches alternately to the source of current supply, thereby to cause the lamps alternately to display representations of the changing functions.

4. The invention defined in claim 3 wherein said separate circuit controlling means comprises a relay having an armature normally resting when the relay is deenergized in position to connect its lamp circuit to a switch in said first group and movable when the relay is energized into position to disconnect said lamp circuit from said switch and connect the lamp circuit to a source of current supply.

5. In a display sign comprising a display panel having a plurality of lamps mounted upon it, said lamps being connected in a plurality of separate lamp circuits, a first information indicating mechanism comprising a plurality of switches manipulated by said first mechanism, a second information indicating mechanism comprising a plurality of switches manipulated by said second mechanism, a power source for said switches in said first and second mechanisms, each of said lamp circuits being energizable by one of said switches of said first and second mechanisms, the improvement in means for alternately energizing said lamp circuits by the closed switches of each mechanism whereby to alternately display on said display panel the information indicated by said first and second mechanisms, comprising means alternately connecting to said power source all of said switches of said first mechanism or all of said switches of said second mechanism at spaced time intervals, and means operable when said switches of said first mechanism are not connected to said power source to render ineffective any closed switch of said first mechanism which is adapted to energize a lamp circuit energized by a closed switch of said second mechanism.

References Cited in the file of this patent

UNITED STATES PATENTS

| | | |
|---|---|---|
| 883,992 | Wentz | Apr. 7, 1908 |
| 1,795,536 | Baker | Mar. 10, 1931 |
| 1,911,949 | Gould | May 30, 1933 |
| 1,972,941 | Lewis | Sept. 11, 1934 |
| 2,207,743 | Larson et al. | July 16, 1940 |
| 2,290,261 | Welch | July 21, 1942 |
| 2,673,976 | Williams | Mar. 30, 1954 |
| 2,745,243 | Schumacher | May 15, 1956 |

FOREIGN PATENTS

| | | |
|---|---|---|
| 359,539 | Great Britain | Oct. 26, 1931 |
| 528,624 | Great Britain | Nov. 4, 1940 |